United States Patent Office 3,493,650
Patented Feb. 3, 1970

3,493,650
PERFUME AND DEODORIZING WITH
CITRONELLYL SENECIOATE
Morris Dunkel, Paramus, N.J., assignor to Universal Oil Products Company, Des Plaines, Ill., a corporation of Delaware
No Drawing. Filed May 13, 1966, Ser. No. 549,805
Int. Cl. A61k 7/00; C11b 9/00; C07c 69/52
U.S. Cl. 424—65                                 5 Claims

ABSTRACT OF THE DISCLOSURE

Novel perfume and deodorizing compositions containing citronellyl senecioate and the use of such compositions to deodorize and eliminate malodors. Citronellyl senecioate is characterized by a geranium odor profile.

---

This invention relates to new compositions of matter and, more particularly, to citronellyl senecioate, and to novel perfume and deodorizing compositions containing citronellyl senecioate as well as to methods of using such compositions to deodorize and eliminate malodors.

Various esters of mono- or dimethyl substituted acrylic acids, for example, geranyl crotonate, benzyl crotonate, geranyl senecioate, geranyl tiglate, or lauryl methacrylate have been utilized as perfumery or deodorizing substances. It has now been discovered, however, that, of this large class of compounds, the specific and novel compound citronellyl senecioate possesses a unique and highly persistent odor and odor profile characterized by a leafy topnote blending into a geranium body note which renders it of particular utility in creating perfume compositions having geranium notes or as a replacement or extender for natural geranium oil. This compound moreover also possesses a unique ability to rapidly deodorize and eleminate malodors such as those caused by cooking, smoking or decaying organic materials which renders it of considerable importance as a deodorant in aerosol sprays or deodorizing cosmetics.

Accordingly, it is an object of this invention to provide a new composition of matter comprising citronellyl senecioate. Another object is to provide novel perfume and deodorant compositions containing citronellyl senecioate. A still further object of this invention is to provide methods for deodorizing and eleminating malodors using such compositions. These and other objects of this invention will become apparent from the following further detailed description thereof.

The novel compound of this invention, citronellyl senecioate, having the following structural formula:

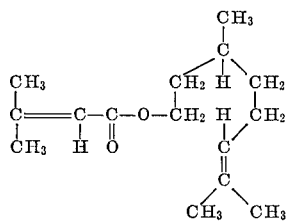

may be prepared by several different methods including for example esterification where citronellol is reacted with senecioic acid in the presence of a catalyst and, if desired, a solvent; transesterification where a lower alkyl ester of senecioate acid, for example, methyl senecioate, is reacted with citronellol in the presence of a transesterification catalyst such as sodium methylate and while continuously removing the lower alkyl alcohol from the reaction mixture as if forms; or by reacting a senecioyl halide, for example senecioyl chloride, with citronellol.

As indicated, citronellyl senecioate possesses highly desirable odor properties characterized by an odor profile having a leafy topnote which subsequently blends into rich geranium-like body notes. This odor moreover is highly persistent and lasting. For example, placed on a perfume blotter, the odor is still fresh and persistent even after four days storage under ambient inside room conditions. These properties render citronellyl senecioate highly valuable in creating novel perfume compositions particularly perfumes having geranium notes or for use as a replacement or extender for natural geranium oil. As used herein the term perfume means a mixture of synthetic or naturally derived organic compounds including, for example, alcohols, aldehydes, ethers, ketones, esters and frequently also hydrocarbons which are combined in fixed proportions so that the odors of the individual compounds combine to produce a harmonious fragrance. In perfumery practice, these compounds are combined through the blending of natural oils, gums, resins, animal derivates, absolutes, natural isolates or synthetic chemicals.

The amount of citronellyl senecioate incorporated as an olfactory ingredient into the perfume compositions of this invention may be varied within a wide range and depends upon the particular type of perfume to be prepared or improved and whether the senecioate is used in geranium-type perfumes to extend or replace the natural geranium oil constituent thereof. In general, the amount may range from about 0.1 to 90 percent of the total weight of the perfume composition with amounts ranging from 5 to 35 percent being preferred, particularly when creating perfumes having geranium notes.

The perfume compositions of this invention containing the citronellyl senecioate as an olfactory ingredient may be used per se in alcoholic solutions or incorporated into materials such as cosmetic creams, soaps, synthetic detergents, talcum powders, or other toilet goods such as shampoos to produce products having desirable fragrance properties of long-lasting quality.

As indicated, citronellyl senecioate has unique properties in eliminating malodors such as those caused by cooking, smoking, perspiration or by decaying organic materials. In this respect, citronellyl senecioate has the ability of quickly eliminating such malodors permanently and without creating objectional odors of its own or through combination with the malodors. These properties render citronellyl senecioate highly valuable as a deodorant in contrast to many of the commonly used deodorizing substances which merely mask the malodors and which frequently also create an unpleasant odor in combination with the malodors. The particular reason why critonellyl senecioate is so effective as a deodorizing substance is not completely understood at this time. It is believed, however, based upon present theory, that the citronellyl senecioate reacts chemically with many of the functional groups usually found in common malodors and thus destroys the malodors permanently in contrast to merely masking them. Citronellyl senesioate may be used to deodorize or eliminate malodors according to several different methods. For example, when the malodors are in the air contained in an enclosure, such as a room, the citronellyl senecioate is advantageously sprayed into the airspace to eliminate the malodors therefrom. When the malodors are on human skin, another method involves incorporating the citronellyl senecioate into a cream and then contacting the cream with the skin to eliminate the malodors therefrom. When the malodors are in commercial products, for example, laundry bleaches, still another method involves adding the citronellyl senecioate to the product directly to eliminate the malodors.

In spraying citronellyl senecioate, several different methods may be utilized. In the simplest, the citronellyl senecioate either per se or more preferably admixed with a support such as an alcohol, for example ethanol, may be sprayed or atomized into the desired space. A more preferred form of spraying, however, involves using aerosol sprays. In this method, a deodorant composition may be prepared by mixing the citronellyl senecioate with a support comprising a gaseous propellant of the type commonly used in aerosols such as nitrogen or a halogenated hydrocarbon such as dichloro-difluoromethane and also, if desired, with a solvent such as an alcohol, for example ethanol. The deodorant composition is then incorporated into an aerosol dispenser according to conventional procedures and the propellant gas is then utilized to spray the deodorant composition. If desired, a perfume may also be added to the aerosol deodorant composition so as to leave a lightly perfumed atmosphere to the airspace after the citronellyl senecioate has eliminated the malodors therefrom. In preparing aerosol deodorant compositions, the quantity of citronellyl senecioate added may be varied over a wide range, Generally, however, the citronellyl senecioate may be satisfactorily used in quantities of from about 0.1 to 10 percent of the total weight of the aerosol deodorant composition with quantities of about 0.5 to 1 percent being more commonly used under most circumstances. Typically, a suitable aerosol deodorant composition will contain by weight about 0.5 percent of citronellyl senecioate, about 15 percent of an alcohol solvent with the remainder being the gaseous propellant. If a perfume is desired, it may be added to the citronellyl senecioate component of the deodorant composition in a quantity ranging from about 5 to 20 percent based upon the weight of the citronellyl senecioate.

In eliminating malodors from human skin, such as those caused by perspiration or by the handling of odorous materials such as fish, a deodorant composition may be prepared by incorporating the citronellyl senecioate into a support comprising a cream base and such deodorant composition may then be contacted with the skin to eliminate the malodor therefrom. The cream support may comprise any of the well known cream bases widely used in cosmetics. Typically, such creams contain emulsifiers such as fatty acid soaps, for example potassium stearate; emollients to soften the skin, such as lanolin; healing agents to prevent skin chapping, such as allantoin; barrier agents to protect the skin, such as waxes, for example beeswax and also perfumes. The quantity of the citronellyl senecioate incorporated into the cream base may be widely varied. Usually, however, a quantity of from about 1 to 30 percent based upon the total weight of cream base is generally sufficient with an amount ranging from about 2 to 10 percent being more commonly used.

The following examples are cited to illustrate the novel compositions of this invention and the methods of using such compositions as perfumes and deodorants. The specific examples cited, however, are not intended to limit the invention to the specific perfumes, deodorants or uses thereof as recited therein.

EXAMPLE I

Citronellyl senecioate was prepared by charging about 75 grams (0.75 mol) of senecioic acid, 117 grams (0.75 mol) of citronellol, 100 milliliters of toluene and 2 grams of methyl sulfonic acid to a reaction flask equipped with an overhead condenser with a water trap. The mixture was heated to reflux (a well temperature ranging from 122° C. to 135° C.) and maintained thereat for about five hours during which time about 12.5 milliliters of water were collected. The reaction mixture was cooled, washed with an aqueous sodium carbonate solution, then with water, and finally with a saturated sodium chloride solution. After the toluene was flashed from the washed mixture, the mixture was fractionally distilled to recover about 89 grams of citronellyl senecioate boiling at 165° C. at 6 mm. Hg and having a refractive index $n_D^{20}$ 1.4670. Analysis by Gas-Liquid Chromatography indicated that the product was 90.5 percent pure.

EXAMPLE II

A geranium type perfume is prepared using a standard formula (No. 2252 from W. A. Poucher, Perfumes, Cosmetics and Soaps, vol. 3, p. 163, Van Nostrand, 1960) having the following composition:

Perfume A

| Component: | Parts by weight |
| --- | --- |
| Geranium oil | 250 |
| Bergamol oil | 150 |
| Sandalwood oil | 100 |
| Bois de rose oil | 100 |
| Patchouli oil | 20 |
| Ylang-ylang oil | 30 |
| Phenylethyl alcohol | 200 |
| Rose otto | 10 |
| Isobutyl-phenylacetate | 40 |
| Cinnamic alcohol | 50 |
| Terpeneol | 40 |
| Coumarin | 10 |

The perfume is sampled on a perfume blotter and found to have a pleasant geranium top note and odor profile.

Two more perfumes, B and C, are prepared except that in perfume B the geranium oil component is replaced with a mixture of 125 parts of natural geranium oil and 125 parts of citronellyl senecioate, and in perfume C the entire natural geranium oil component is replaced by 250 parts of citronellyl senecioate. The perfumes B and C are sampled on perfume blotters and are found to closely resemble perfume A in having similar geranium top notes and odor profiles. In addition it is noted that both perfumes B and C have an improved dryout note, that is, the odor is very persistent particularly the geranium notes.

EXAMPLE III

The deodorizing ability of citronellyl senecioate may be demonstrated as follows:

Part A

An aerosol having the following composition by weight is prepared and placed in an aerosol dispenser:

| | Percent |
| --- | --- |
| Citronellyl senecioate | 0.5 |
| Ethyl alcohol | 15 |
| Fluoronated hydrocarbon propellant | 84.5 |

The deodorant is sprayed several times, for two-second durations, into a room measuring about 10 x 12 feet and containing cigar smoke. It is noted that the unpleasant smoke odor quickly disappears; that the deodorant leaves no substantial odor of its own and that the smoke odor does not reappear.

Part B

Part A is repeated except that to the citronellyl senecioate component of the aerosol composition is added 10 weight percent of Perfume A prepared as in Example II. It is observed that in using the perfumed aerosol, the room air, following deodorization, is slightly and pleasantly perfumed.

Part C

A deodorant cream having the following composition (standard cream formulation No. 2253 from page 163 of reference referred to in Example II) is prepared using as the perfume component perfume A as prepared in Example II.

| Component: | Parts by weight |
|---|---|
| Stearic acid | 200 |
| Potassium hydroxide, sticks | 14 |
| Carbitol | 40 |
| Perfume A | 10 |
| Citronellyl senecioate | 26 |

The cream is applied to hands having fishy malodors thereon and it is noted that the malodors quickly disappear leaving only a pleasant geranium odor.

I claim is my invention:

1. A process for deodorizing offensive odors arising from malodorous substances which comprises contacting the malodorous principal with an effective amount of citronellyl senecioate to deodorize said principal.

2. A process according to claim 1 in which the citronellyl senecioate is dissolved in a solvent.

3. A process according to claim 2 in which the solvent is an alcohol.

4. A process according to claim 1 in which the citronellyl senecioate is contained in a cosmetic cream.

5. A perfume mixture containing an effective amount of an olfactory ingredient citronellyl senecioate whereby said perfume has a geranium odor profile.

References Cited

UNITED STATES PATENTS

| 3,074,891 | 1/1963 | Kulka | 167—90 X |
| 3,105,089 | 9/1963 | Kupchan | 260—486 |
| 3,215,719 | 11/1965 | Allen | 167—94 X |

OTHER REFERENCES

Bedoukian, Perf. Synth. & Isolates, D. Van Nostrand & Co., N.Y., 1951, pp. 152–55, 159–61, 165, 166, 208–214.

Kulka, Soap & Chem. Specialties, vol. 39, January 1963, pp. 89, 91, 94, 96.

ALBERT T. MEYERS, Primary Examiner

A. P. FAGELSON, Assistant Examiner

U.S. Cl. X.R.

252—522; 260—486; 424—43, 45, 47, 76